United States Patent
Norimatsu

(10) Patent No.: US 7,154,685 B2
(45) Date of Patent: Dec. 26, 2006

(54) MANUFACTURING METHOD OF ROD WITH OPTICAL THIN FILM AND ROD BLOCK FOR USE IN THE METHOD

(75) Inventor: Hodaka Norimatsu, Osaka (JP)

(73) Assignee: Nippon Sheet Glass Company, Limited (JP)

( * ) Notice: Subject to any disclaimer, the term of this patent is extended or adjusted under 35 U.S.C. 154(b) by 404 days.

(21) Appl. No.: 10/730,790

(22) Filed: Dec. 9, 2003

(65) Prior Publication Data
US 2004/0126505 A1    Jul. 1, 2004

(30) Foreign Application Priority Data
Dec. 25, 2002   (JP) .............................. 2002-375024

(51) Int. Cl.
*G02B 6/00* (2006.01)
(52) U.S. Cl. .................... 359/896; 359/652; 385/34
(58) Field of Classification Search ................ 359/652, 359/811, 896; 385/33, 34
See application file for complete search history.

(56) References Cited

FOREIGN PATENT DOCUMENTS

| JP | 54-58851 | 5/1979 |
|---|---|---|
| JP | 3-14590 | 4/1988 |
| JP | 2002-255580 | 9/2002 |

*Primary Examiner*—Scott J. Sugarman
*Assistant Examiner*—Darryl J. Collins
(74) *Attorney, Agent, or Firm*—Caesar, Rivise, Bernstein, Cohen & Pokotilow, Ltd.

(57) ABSTRACT

A method for manufacturing a rod with an optical thin film which comprises forming a rod block by arranging a plurality of rods each having a circular cross section in parallel to one another along the axis of each rod and by allowing a resin to enter gaps between rods adjacent to one another to fix the rods to one another. The rod block is cut into a predetermined length. The endfaces of each rod positioned on the cut endface of the rod block are then polished. An optical thin film is formed on the polished endfaces of each rod. The resin has a melting point higher than the temperature used in forming the film. The rods are separated from one another by removing the resin from the rod block.

5 Claims, 5 Drawing Sheets

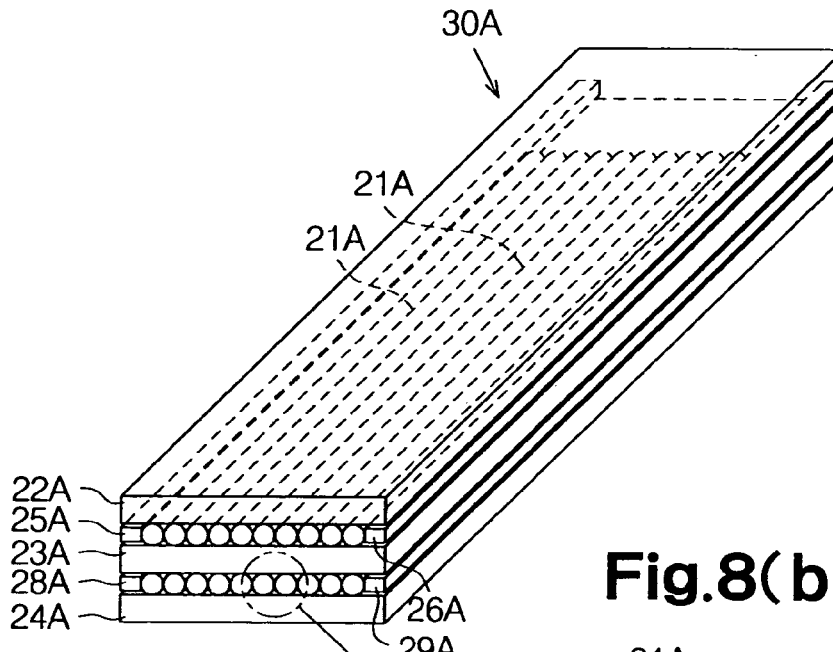
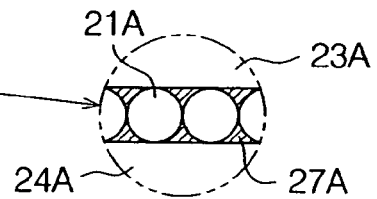
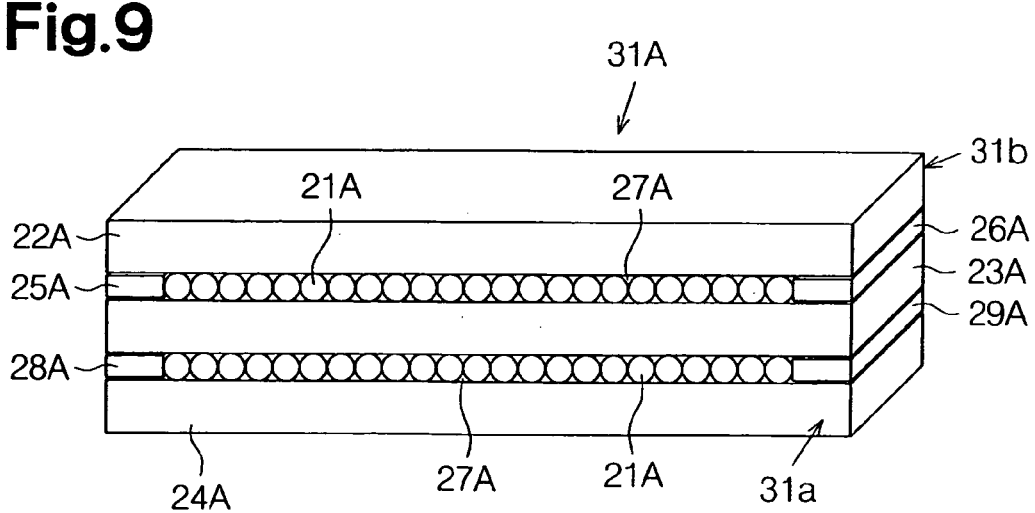

US 7,154,685 B2

MANUFACTURING METHOD OF ROD WITH OPTICAL THIN FILM AND ROD BLOCK FOR USE IN THE METHOD

BACKGROUND OF THE INVENTION

The present invention relates to a method for manufacturing a rod with an optical thin film, and also relates to a rod block for use in this method.

Conventionally, there has been known a technology for previously forming a filter on an endface of a gradient index rod lens and thereby eliminating problems with alignment of the rod lens and the filter element and making the optical system more compact. For example, refer to Japanese Laid-open Patent Publication No. 54-56851.

Furthermore, Japanese Laid-open Patent Publication No. 2002-255580 discloses a technology for integrating with a resin, such as wax, a plurality of slender rod lens preforms having a predetermined refractive index distribution, and cutting off the rod lens preforms into a predetermined length at one time. After each cut endface of the rod lens preforms is subjected to a polishing process and the like, a desired optical film is formed on each endface of the rod lens preforms.

Further, in Japanese Examined Patent Publication No. 3-14590, there is known a technology in which, prior to the film formation, a resin, such as wax for fixing a plurality of rod lens preforms, is removed to separate the rod lens preforms from one another and the separated rod lens preforms are fixed to a jig piece by piece. The reason for separating the rod lens preforms from one another before the film formation is that in the case of integrating the rod lens preforms with a resin, the resin is melted by heat applied during the film formation, and as a result, the rod lens preforms cannot be integrally held, or there is the possibility that the melted wax flows out onto the surface of the rod lens to inhibit the film formation, or the vaporized wax adsorbs on the rod lens endface to cause deterioration in film quality.

However, as for the removal of resin and separation of the rod lens preforms from one another before the optical film formation, and for the fixing of the separated rod lens preforms to a jig, it takes a lot of time to conduct the preliminary work and a long working time is required.

Furthermore, there is the possibility that due to the preliminary work before the film formation, defects are produced, leading to the reduction of the yield. This is because during the preliminary work, there arise problems in that the individual rod lens preforms contact one another, tweezers or the like for clipping small rod lens preforms come into contact with the rod lens preforms and damage the lenses, or small rod lens preforms scatter in all directions and are lost.

SUMMARY OF THE INVENTION

The present invention has been made by taking notice of these conventional problems, and the object of the present invention is to provide a method for manufacturing a rod with an optical thin film, in which steps of from cutting to film formation are performed in a state where a plurality of rods are fixed, thereby improving manufacturing efficiency and yield. The object of the present invention also includes providing a rod block for use in this method.

To achieve the foregoing and other objective and in accordance with the purpose of the present invention, a method for manufacturing a rod with an optical thin film is provided. A plurality of rods are integrally fixed with a resin so as to have axes running in parallel to one another. The method includes sequentially performing: cutting the rods into a predetermined length; polishing the cut endfaces of the rods; and forming an optical thin film on the polished endfaces of the rods, wherein the resin has a melting point higher than the temperature to which the rods are exposed during said forming.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8(a) is a perspective view showing a glass rod block used in a comparative example;

FIG. 8(b) is a partially enlarged front view of the glass rod block shown in FIG. 8(a);

FIG. 9 is a perspective view showing the lens block produced from the glass rod block of FIG. 8(a);

DETAILED DESCRIPTION OF THE PREFERRED EMBODIMENTS

Figure 1:
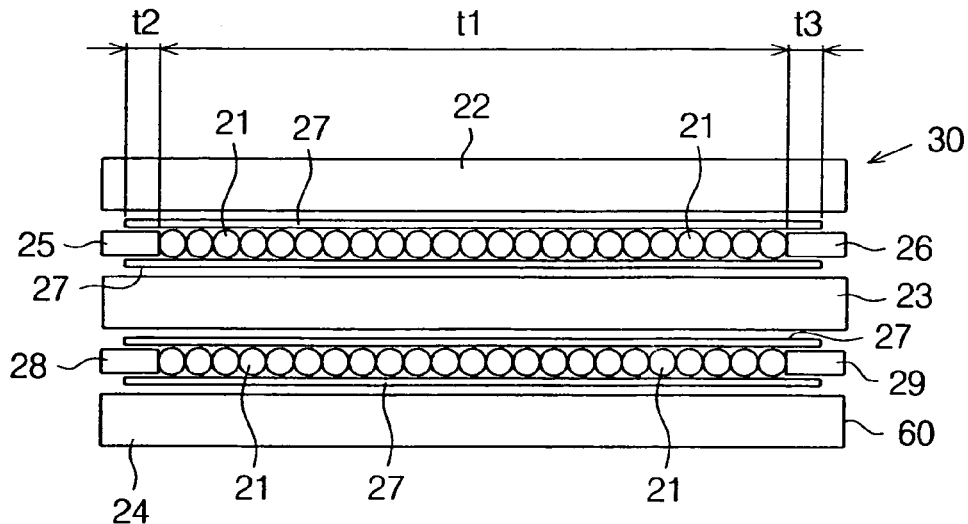
FIG. 1 is a front view showing an arrangement of each member constructing a glass rod block for use in the method for manufacturing a rod with an optical thin film according to one embodiment.

One embodiment of the method for manufacturing a rod with an optical thin film embodied in the present invention is described below by referring to the drawings. The method for manufacturing a rod with an optical thin film comprises a block forming step, a block cutting step, a polishing step, a film forming step, and a lens separating step.

Figure 2A:
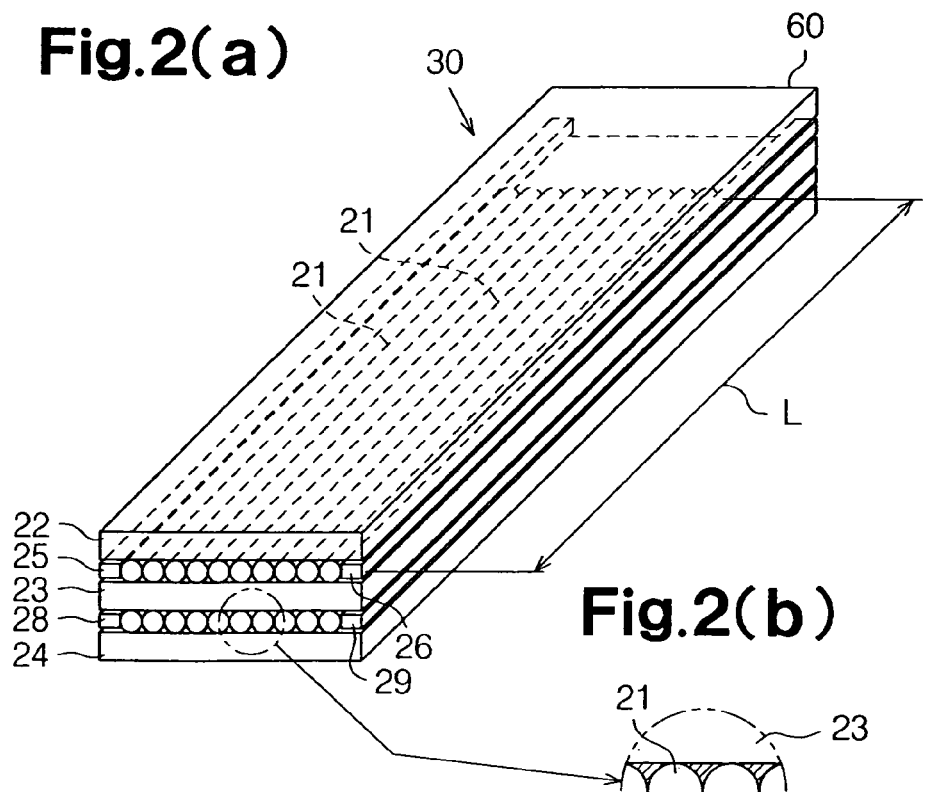
FIG. 2(a) is a perspective view showing a glass rod block.
Figure 2B:
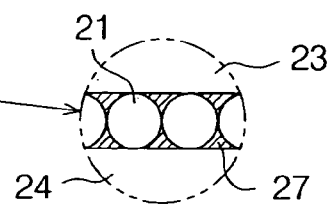
FIG. 2(b) is a partially enlarged front view of the glass rod block shown in FIG. 2(a)

As shown in FIG. 1, and FIGS. 2(a) and 2(b), in the present embodiment, a plurality of glass rod lens preforms 21 are integrally fixed with a thermoplastic resin so as to have optical axes running in parallel to one another and thereby producing a rod assembly, namely, a glass rod block 30. Each of the rod lens preforms 21 has a predetermined refractive index distribution.

In the glass rod block 30 of this embodiment, the rod lens preforms 21 are arranged in two rows so as to have optical axes running in parallel to one another, and integrally fixed with the thermoplastic resin.

In the block forming step in this embodiment, as shown in FIG. 1, the rod lens preforms 21 are each arranged in a row between an upper holding plate 22 and an intermediate holding plate 23, and between the intermediate holding plate 23 and a lower holding plate 24. Side plates 25, 26, 28 and 29 are each arranged on the outside of the rod lens preforms 21 in each row. The holding plates 22 to 24 and the side plates 25, 26, 28 and 29 are each made of glass, for example, soda-lime glass.

Thermoplastic resin films 27 are each arranged on the upper side and lower side of the rod lens preforms 21 in each row. Each resin film 27 has a width which covers a part of from almost the middle part of the left upper side plate 25 to almost the middle part of the right upper side plate 26, more specifically, a width (t1+t2+t3) resulting from adding an approximately half width (t2, t3) of both the side plates 25 and 26 to the whole width (t1) along the alignment direction of the rod lens preforms 21, that is, the film 27 each has a length L which covers almost the entire length of the rod lens preforms 21.

As the resin film 27, there is used a resin film having heat resistance such that a fixed state of the rod lens preforms 21 can be kept even at the maximum temperature (a process temperature during the film formation, e.g., 200° C.) in the step of forming an optical thin film. In short, the resin film 27 has a melting point higher than the process temperature during the film formation. The materials of the resin film 27 include polycarbonate, polysulfone, polyether sulfone or polyolefin. These resins become sufficiently soft at a temperature of 350° C. or lower, where characteristics of the rod lens preforms 21 are not deteriorated, so that the resins can enter gaps between the rod lens preforms 21. Further, the resins are sufficiently hard so as to be capable of holding the rod lens preforms 21 without problems when the temperature is around the process temperature during the film formation, and the amount of a gas generated in a vacuum atmosphere is also sufficiently small so as to exert no influence on the film formation. The process temperature during the film formation varies depending on the film formation apparatus or the object, therefore, a resin suitable for the apparatus must be selected for the resin film 27.

The order of arrangement for each holding plate, side plate, and resin film is not particularly limited, and stacking is usually performed starting from the bottom, for example, in the order of the lower holding plate 24, the resin film 27, the lower rod lens preforms 21, the right and left side plates 28 and 29, the resin film 27, the intermediate holding plate 23, the resin film 27, the upper rod lens preforms 21, the right and left side plates 25 and 26, the resin film 27, and the upper holding plate 22.

Next, the side plates 25 and 26, and the side plates 28 and 29 are each pressed against the rod lens preforms 21, so that the rod lens preforms 21 in each row are brought into contact with one another. In this state, while applying a pressing force to the upper and lower holding plates 22 and 24, the entire assembly is heated to about 250° C., kept for about 30 minutes and then, cooled to an ordinary temperature.

The heating temperature and heating time in this case are applicable to a case of selecting polycarbonate as a material for the resin film 27. Due to the heating, the resin film 27 enters the gaps between the rod lens preforms 21 and the entire periphery thereof as shown in FIGS. 2(a) and 2(b). Via the resin film 27, the rod lens preforms 21 arranged in two rows, the holding plates 22, 23 and 24, and the side plates 25, 26, 28 and 29 are integrally fixed to form the glass rod block 30. Respective holding plates 22, 23 and 24, and respective side plates 25, 26, 28 and 29 construct a holding frame 60 for the rod lens preforms 21.

The heating temperature and heating time of the resin film 27 are suitably set according to the type of resin selected. The heating temperature is about 300° C. in the case of selecting polysulfone, about 350° C. in the case of selecting polyether sulfone and about 300° C. in the case of selecting polyolefin, in place of polycarbonate as the material for the resin film 27. The heating time is not changed in these cases.

Figure 3:
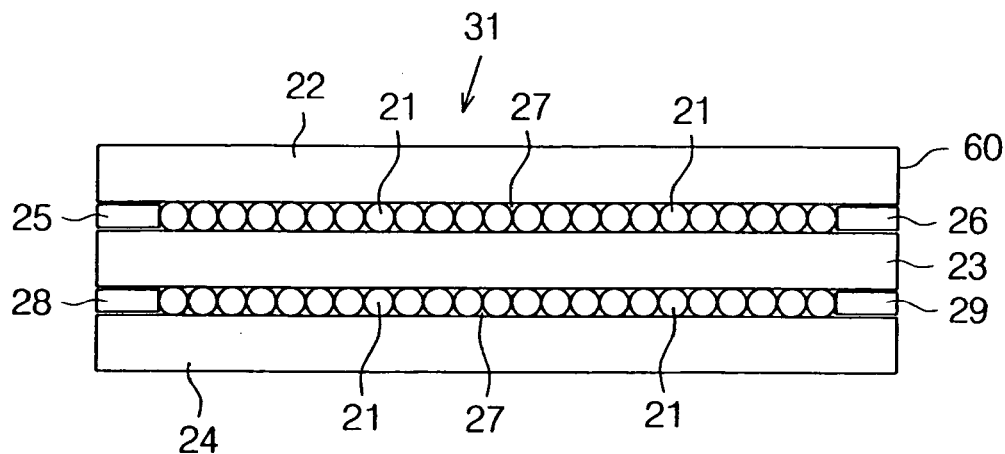
FIG. 3 is a front view showing a lens block produced from the glass rod block of FIG. 2.
Figure 4:
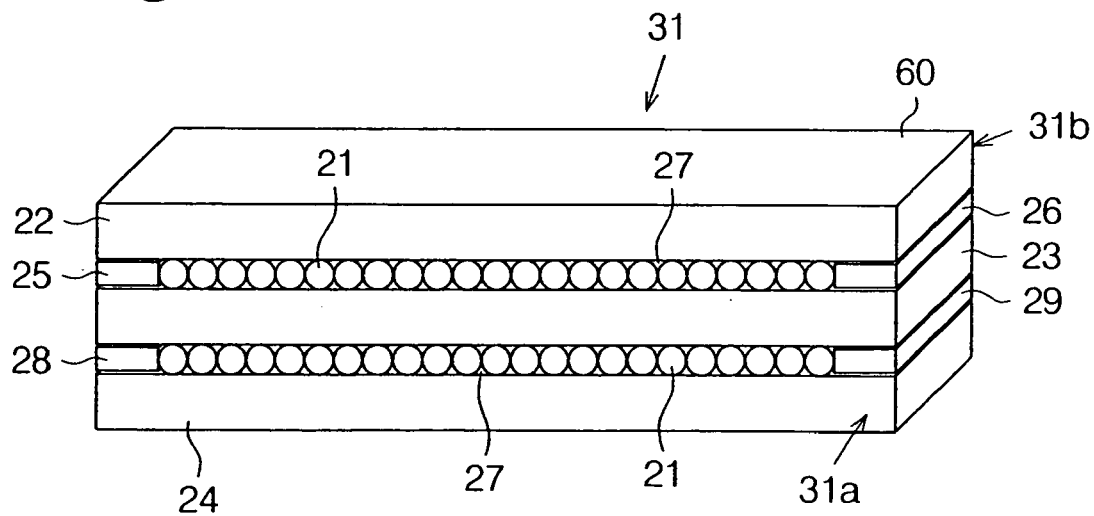
FIG. 4 is a perspective view showing the lens block of FIG. 3.

In the next block cutting step, the entire glass rod block 30 produced in the above-described block forming step is cut into a predetermined length to produce a lens block 31 as shown in FIG. 3 and FIG. 4. By cutting the entire glass rod block 30 into a predetermined length, all the rod lens preforms 21 integrally fixed with the resin film 27 are simultaneously cut into a predetermined length.

Next, in the polishing step, cut endfaces 31a and 31b of the lens block 31 shown in FIG. 3 and FIG. 4 are ground such that the endfaces of all the rod lens preforms 21 positioned on the cut endfaces 31a, 31b are ground into a predetermined shape, for example, a flat surface perpendicular to the optical axes or an inclined surface inclined at a predetermined angle with respect to the optical axes, and then the ground endfaces are polished, whereby the lens block 31 for use in the sequential film forming step is produced.

In the next film forming step, an optical thin film, for example, a CWDM band pass filter is formed on each endface of the rod lens preforms 21 held by the polished lens block 31 by the use of a sputtering method, or the like. CWDM is an abbreviation for "Coarse Wavelength Division Multiplexing."

Figure 7:
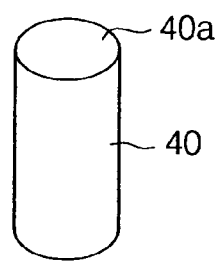
FIG. 7 is a perspective view showing the rod lens produced according to the method in one embodiment.

Next, in the lens separating step, the resin film 27 in the lens block 31 is dissolved or swollen with a solvent to dismantle the lens block 31 after completion of the film forming step, whereby the rod lens preforms 21 are separated from one another. Thus, a plurality of gradient index rod lenses 40 as a rod with an optical thin film, wherein each has a predetermined length and comprises an endface (a filter formed face) 40a having formed thereon an optical thin film, are formed as shown in FIG. 7.

In the method for manufacturing a rod with an optical thin film according to this embodiment, the following advantages are provided.

(1) According to this embodiment, when the gradient index rod lenses 40 each comprising the endface having thereon an optical thin film are produced from the rod lens preforms 21, the steps of from the cutting step to the film forming step can be performed in the state where the rod lens preforms 21 are integrally fixed with the resin film 27.

(2) In the block formation step, the resin film 27 having heat resistance such that a fixed state of the rod lens preforms 21 can be kept at a process temperature during the film formation is used as a resin integrally fixing the rod lens preforms 21 to produce a glass rod block 30 comprising the rod lens preforms 21 integrally fixed with this resin film 27. The resin film 27 has a melting point higher than the process temperature during the film formation. The glass rod block 30 is cut into a predetermined length, and the cut endface is polished to produce the lens block 31. The thus obtained lens block 31 is used in the film forming step.

Thus, the steps of from the cutting step of cutting the rod lens preforms 21 into a predetermined length to the film forming step of forming an optical thin film on each endface of the rod lens preforms 21 can be performed in the state where the rod lens preforms 21 are integrally fixed with the resin film 27. Therefore, work is not required such that during the film forming step, the rod lens preforms 21 are separated from one another, and the separated rod lens preforms 21 are fixed to a jig piece by piece. By virtue of this, the labor or man-hours for the preliminary work in the film forming step can be reduced and at the same time, damage, scattering and loss of the rod lens preforms 21, which have been generated by the work, can be avoided. Accordingly, improvement in production efficiency and yield can be attained.

(3) After completion of the step of forming an optical thin film, the resin film 27 is dissolved or swollen with a solvent to dismantle the lens block 31, whereby the rod lens preforms 21, each comprising an endface having formed thereon an optical thin film, can be easily separated from one another.

(4) The glass rod block 30 shown in FIG. 2(*a*) is produced by a method where the rod lens preforms 21, and the holding plates 22 to 24 and side plates 25, 26, 28 and 29 constructing the holding frame 60 for holding the rod lens preforms 21 are integrally fixed with the resin film 27. Further, the glass rod block 30 is cut into a predetermined length and the cut endface is polished to produce the lens block 31. Therefore, rigidity of the glass rod block 30 and the lens block 31, which is demanded in conducting each step other than the lens separating step, can be secured by the holding frame 60, and further the holding frame 60 can prevent the rod lens preforms 21 from getting scratched.

(5) The holding frame 60 is composed of three holding plates 22 to 24 for sandwiching the whole plurality of rod lens preforms 21 in each row and four side plates 25, 26, 28 and 29 for sandwiching the rod lens preforms 21 at both the sides in each row. Therefore, the arrangement can be easily performed so that the optical axes of the rod lens preforms 21 are parallel and the adjacent rod lens preforms 21 contact one another. Further, since the holding plates and side plates constructing the holding frame 60 are made of glass, for example, soda-lime glass, the glass rod block 30 and lens block 31 having rigidity and heat resistance at the same time can be obtained.

(6) To outer peripheral surfaces of the gradient index rod lenses 40 (see FIG. 7) after passing through the lens separating step, a film formation material used for the optical film formation in the endface 40*a* is not adhered. This is because during the film formation in the endface 40*a*, the thermoplastic resin fills in the gaps between the rod lens preforms 21 to cover the whole periphery of each base material 21 with the resin.

(7) The lens block 31 of FIG. 4, produced by cutting the glass rod block 30 shown in FIGS. 2(*a*) and 2(*b*) into a predetermined length and polishing the cut endface, is used as it is without dismantlement, and the formation of the optical thin film is performed. Therefore, all the filter formed surfaces of the respective rod lens preforms 21 within the lens block 31 are aligned on the same flat plane. Thus, variations of the film thickness and the quality can be reduced at each of the rod lens preforms 21 during the formation of a multilayer film or a thick film such as the filter.

EXAMPLE

The Example is described below by referring to FIG. 1 to FIG. 7.

In this Example, the glass rod block 30 shown in FIGS. 2(*a*) and 2(*b*) is produced by using three holding plates 22, 23 and 24, four side plates 25, 26, 28 and 29, four resin films 27 and forty-eight rod lens preforms 21 as shown in FIG. 1. Each of the holding plates 22, 23 and 24 has a thickness of 4 mm, a width of 50 mm and a length of 150 mm, and is made of soda-lime glass. Further, each of the side plates 25, 26, 28 and 29 has a thickness of 1.7 mm, a width of 5 mm and a length of 150 mm, and is made of soda-lime glass. The thermoplastic resin film 27 is a polycarbonate film having a thickness of 200 µm, a width of 47 mm and a length of 115 mm. Each of the rod lens preforms 21 has a diameter of 1.8 mm and a length of 117 mm.

Using these members, while applying a pressing force to the upper and lower holding plates 22 and 24 in the state of bringing the adjacent rod lens preforms 21 in each row into contact with one another, the whole block was heated to about 250° C., kept for about 30 minutes and then, cooled to an ordinary temperature, whereby there was formed the glass rod block 30 where the rod lens preforms 21 were arranged in two rows, the holding plates 22, 23 and 24 and the side plates 25, 26, 28 and 29 were integrally fixed with the resin film 27.

Next, the whole glass rod block 30 was cut into a predetermined length to produce the lens block 31 shown in FIG. 3 and FIG. 4.

Figure 5:
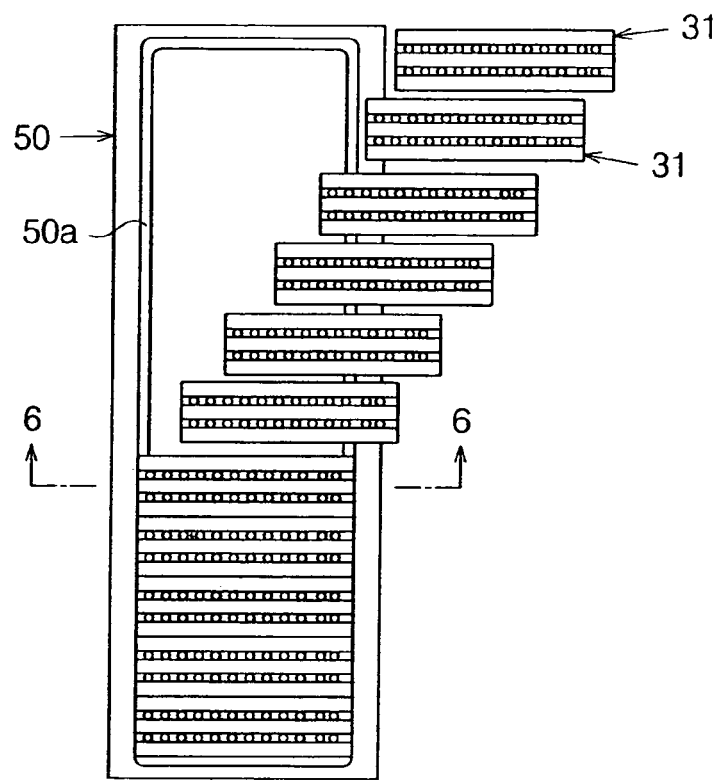
FIG. 5 is an explanatory view showing the preliminary work during the film formation by the use of the lens block of FIG. 3.
Figure 6:
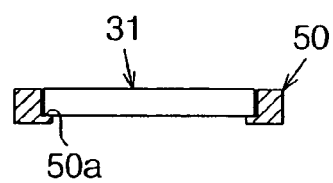
FIG. 6 is a cross-sectional view taken along the line 6—6 of FIG. 5.

Next, the cut endfaces 31*a* and 31*b* of the lens block 31 shown in FIG. 3 and FIG. 4 were ground and then, the ground endfaces were polished, whereby the lens block 31 for use in the sequential film forming step was produced. Next, the thus produced 100 pieces of lens blocks 31 were fixed to a coating jig 50 as shown in FIG. 5 and by a sputtering method, CWDM band pass filters were formed all at one time on each endface of 4800 pieces in total of the rod lens preforms 21 held in each lens block 31. On an inner periphery of the coating jig 50, a supporting face 50*a*, where each of the lens blocks 31 were arranged, was formed as shown in FIG. 5 and FIG. 6. When fixing each of the lens blocks 31 to the coating jig 50, each of the lens blocks 31 may be only arranged on the supporting face 50*a* so as to face upward the filter formed faces of the rod lens preforms 21 held in each of the lens blocks 31.

Figure 12:
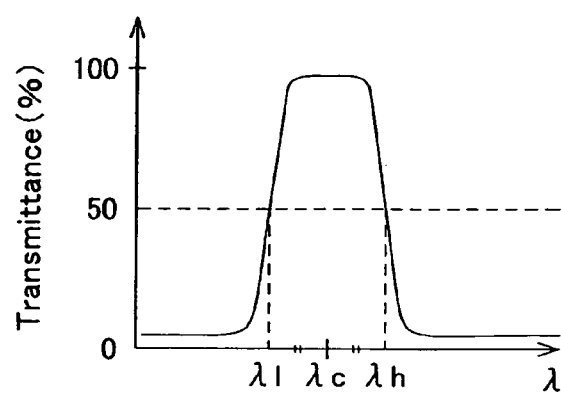
FIG. 12 is a graph showing characteristics of a band pass filter.

In this Example, the man-hours (minute×man) required for the preliminary work for the formation of the CWDM band pass filters on each endface of 4800 pieces of the rod lens preforms 21 was 12 minutes per one worker in terms of 1 coat lot (equivalent to 4800 pieces of rod lenses). Further, adhesion due to shifting of the film formation materials onto an outer peripheral surface of the gradient index rod lens 40 shown in FIG. 7 was observed by a microscope at a magnification of 20 times, and as the result was that no shifting was observed. Further, the outer diameters of the band pass filter formed portion in the gradient index rod lens 40 were compared before and after the film formation, and the results thereof are shown in the following Table 1. The standard deviation σ in a center wavelength λc of the band pass filter formed within the same lot is also shown in Table 1. The center wavelength λc is a wavelength between two wavelengths of λl and λh where transmittance is 50%, as shown in FIG. 12 and the standard deviation σ in the center wavelength λc expresses variations of the center wavelength.

TABLE 1

| | Man-hours for Fixing Jig (minute × man) | Shifting onto Film Side Surface | Filter Surface Side Outer Diameter | | Standard Deviation σ (nm) of λc |
|---|---|---|---|---|---|
| | | | Before Coating (mm) | After Coating (mm) | |
| Example | 12 | Absent | 1.800 | 1.801 | 1.3 |
| Comparative Example | 330 | Present | 1.800 | 1.835 | 4.1 |

Comparative Example

The Comparative Example is described below by referring to FIGS. 8(a) and 8(b) to FIG. 11.

In this comparative example, a glass rod block 30A shown in FIGS. 8(a) and 8(b) is produced by using three holding plates 22A, 23A and 24A, four side plates 25A, 26A, 28A and 29A, and forty-eight rod lens preforms 21A. Each of the holding plates 22A, 23A and 24A has a thickness of 4 mm, a width of 50 mm and a length of 150 mm, and is made of soda-lime glass. Further, each of the side plates 25A, 26A, 28A and 29A has a thickness of 1.7 mm, a width of 5 mm and a length of 150 mm, and is made of soda-lime glass. Each of the rod lens preforms 21A has a diameter of 1.8 mm and a length of 117 mm.

Using these members, the glass rod block 30A shown in FIGS. 8(a) and 8(b) was produced by the following procedures.

First, the rod lens preforms 21A were arranged in a row between two holding plates 22A and 23A, and two holding plates 23A and 24A, respectively, and the side plates 25A, 26A, 28A and 29A were arranged outside both the ends in the row direction of the rod lens preforms 21A in each row.

Next, heated and molten wax 27A was poured into the gaps between the rod lens preforms 21A in each row to cover the whole periphery of each rod lens preform 21A and the whole base material block was cooled to solidify the wax 27A, whereby the rod lens preforms 21A arranged in two rows, the holding plates 22A, 23A and 24A and the side plates 25A, 26A, 28A and 29A were integrally fixed with the wax 27A to produce the glass rod block 30A.

The whole glass rod block 30A produced in this manner was cut into a predetermined length to produce the lens block 31A shown in FIG. 9. Then, the lens block 31A was dipped in ethanol for 24 hours to dissolve the wax 27A and thereby, the rod lens preforms 21A were separated from one another.

Figure 10:
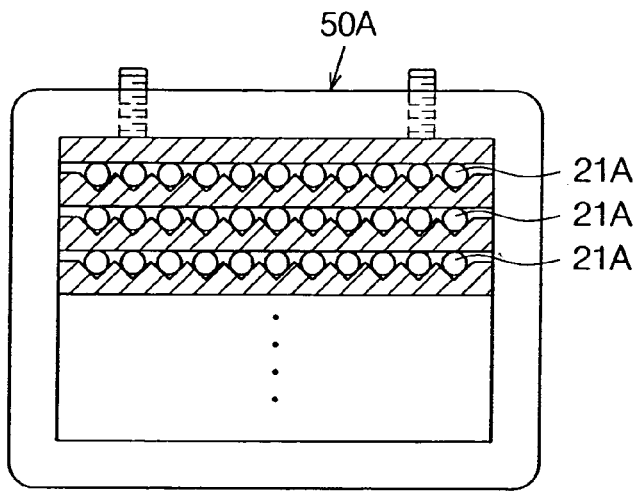
FIG. 10 is an explanatory view showing the preliminary work during the film formation in the comparative example.

Next, 4800 pieces of the separated rod lens preforms 21A were thoroughly washed and fixed to the coating jig 50A as shown in FIG. 10. On each endface of 4800 pieces of the rod lens preforms 21A fixed to the coating jig 50A, CWDM band pass filters were simultaneously formed by a sputtering method or the like.

Figure 11:
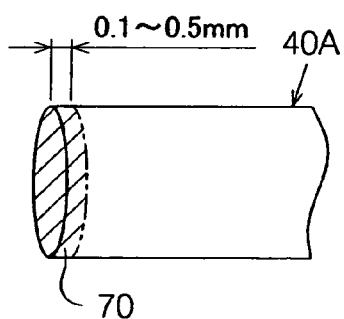
FIG. 11 is a perspective view showing the rod lens produced according to the method in the comparative example.

In this Comparative Example, the man-hours required for the preliminary work for the formation of the CWDM band pass filters on each endface of 4800 pieces of the rod lens preforms 21A was 330 minutes per one worker in terms of 1 coat lot (equivalent to 4800 pieces of rod lenses). Further, adhesion due to shifting of the film formation materials onto an outer peripheral surface of the obtained rod lens 40A was observed by a microscope at a magnification of 20 times, and as a result, shifting of the film formation material 70 was confirmed in the range of 0.1 to 0.5 mm from the film-formed endface as shown in FIG. 11. Further, the outer diameters of the band pass filter formed portions of the gradient index rod lenses 40 and 40A in the Example and the Comparative Example were compared before and after the film formation, and the results thereof are shown in Table 1 above. The standard deviation σ in the center wavelength λc of the band pass filter formed within the same lot is also shown in Table 1.

Comparison between the Example with the Comparative Example has revealed the following. As shown in Table 1, the man-hours required for work in the preliminary stage was 12 minutes per one worker in the Example, whereas it was 330 minutes per one worker in the Comparative Example. From the results above, it can be understood that according to the Example, the working time in the preliminary stage could be greatly reduced.

Further, in the Example, the shifting of the film formation materials onto the outer peripheral surface of the gradient index rod lens 40 was not observed as shown in Table 1, whereas the shifting was observed in the Comparative Example. From the results above, it is presumed that the gradient index rod lens comprising the outer peripheral surface to which the film formation materials did not adhere, was produced by the manufacturing method of a rod with an optical thin film according to the present invention.

Further, in the Example, the outer diameter in the filter formed portion of the gradient index rod lens 40 was 1.800 mm before the filter formation, whereas it was 1.801 mm after the filter formation as shown in Table 1. In other words, the outer diameter of the filter formed portion was insignificantly changed before and after the filter formation. On the contrary, the outer diameter in the filter formed portion of the gradient index rod lens 40A was 1.835 mm after the filter formation in the Comparative Example.

Furthermore, as shown in Table 1, the standard deviation σ (nm) in the center wavelength λc of the band pass filter formed within the same lot was 1.3 in Example, whereas it was 4.1 in Comparative Example. From the results above, it can be understood that when the steps of the cutting step to the film forming step were continuously carried out in the state of integrating the (4800 pieces) rod lens preforms 21 as in the Example, many gradient index rod lenses 40, having extremely reduced variations in their characteristics, could be produced.

It should be apparent to those skilled in the art that the present invention may be embodied in many other specific forms without departing from the spirit or scope of the invention. Particularly, it should be understood that the invention may be embodied in the following forms.

The present invention is applicable also when producing a rod with an optical thin film by the use of a homogeneous glass rod in place of the gradient index rod.

As the resin film 27, a resin other than the above-described resin may be used if it has a property of sufficiently softening, at least at a temperature where characteristics of the rod lens preform 21 or the glass rod do not deteriorate, for example, at a temperature of 350° C. or less, and has a hardness at such a level so as to be able to sufficiently hold the rod lens preform 21 or the glass rod at the process temperature.

In the case of fixing the rod lens preforms 21 with the thermoplastic resin film 27, in place of the resin film 27, a molten thermoplastic resin may be poured into the gaps between the rod lens preforms 21 arranged in the mold or between the holding plates or the side plates.

In the illustrated embodiment, auxiliary energy such as heat or ultrasonic waves may be preferably used in dismantling the lens block 31, whereby the rod lens preforms 21 may be separated more easily in a shorter time from one another after completion of the step of forming an optical thin film.

In the above-described block formation step, a filler may be mixed into the resin film 27 for the purpose of preventing the rod lens preforms 21 from cracking or becoming chipped due to heat shrinkage of the resin film 27 at the time of cooling the whole glass rod block 30 to room temperature. Examples of the filler include glass fiber, glass flake (thin leaf) or fine glass particles. For the same purpose, a glass rod as a dummy may be inserted into the gaps between the rod lens preforms 21.

In place of forming the glass rod block 30 and the lens block 31 into a rectangular parallelepiped, these blocks may be shaped to have three side surfaces, or five or more side surfaces containing two side surfaces in parallel to the optical axes and at an angle with respect to one another.

The holding frame may be formed with a cylindrical glass pipe and the rod lens preforms 21 may be arranged in a space within the same glass pipe so as to have the optical axes running in parallel to one another.

Therefore, the present examples and embodiments are to be considered as illustrative and not restrictive and the invention is not to be limited to the details given herein, but may be modified within the scope and equivalence of the appended claims.

The invention claimed is:

1. A method for manufacturing a rod with an optical thin film wherein a plurality of rods are integrally fixed with a resin so as to have axes running in parallel to one another, wherein the rods each have a circular cross section and are aligned in parallel to and in contact with one another, and the resin is a thermoplastic resin, the method comprising sequentially performing:

forming a rod block by allowing the resin to enter gaps between adjacent rods to thereby fix the rods to one another;

cutting the rods into a predetermined length;

polishing the cut endfaces of the rods;

forming an optical thin film on the polished endfaces of the rods, wherein the resin has a melting point higher than the temperature to which the rods are exposed during said forming; and separating the rods from one another by dissolving or swelling the thermoplastic resin with a solvent to dismantle the rod block after completion of said forming an optical thin film.

2. The method for manufacturing a rod with an optical thin film according to claim 1, wherein, in said separating the rods from one another, auxiliary energy is used.

3. The method for manufacturing a rod with an optical thin film according to claim 1, wherein the rods are rod lens performs each having a predetermined refractive index distribution.

4. A method for manufacturing a rod with an optical thin film, the method comprising:

forming a rod block by arranging a plurality of rods each having a circular cross section in parallel to one another along the axis of each rod, and by allowing a resin to enter gaps between the rods to fix the rods to one another, wherein the rods are rod lens preforms each having a predetermined refractive index distribution, wherein in said forming a rod block, the rods are arranged along a sheet made of the resin and the resin is melted in this state and then hardened to fix the rods to one another with the resin;

cutting the rod block into a predetermined length;

polishing the endfaces of each rod positioned on the cut endface of the rod block;

forming an optical thin film on the polished endfaces of each rod, wherein the resin has a melting point higher than the temperature during said forming of the optical film; and separating the rods from one another by removing the resin from the rod block.

5. The method for manufacturing a rod with an optical thin film according to claim 4, wherein in said separating the rods from one another, a solvent for dissolving the resin and auxiliary energy for accelerating the dissolution of the resin is used.

* * * * *